Nov. 5, 1935. W. DIETRICH 2,019,661
UNIVERSAL SCREEN
Filed July 30, 1932 5 Sheets-Sheet 3
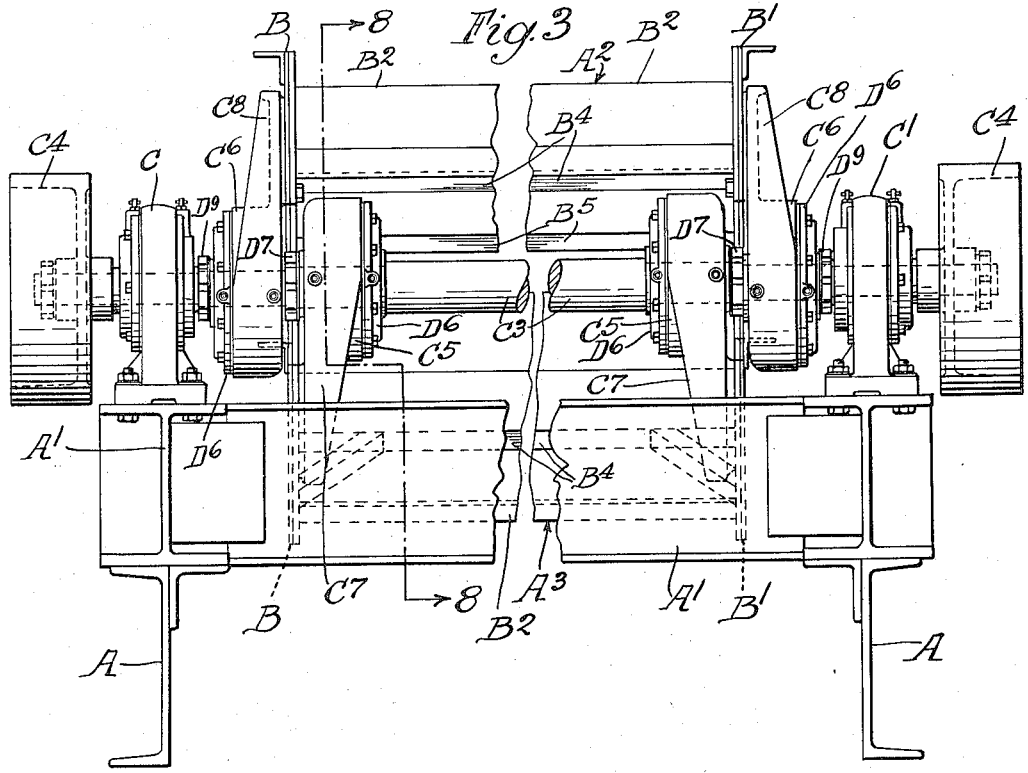
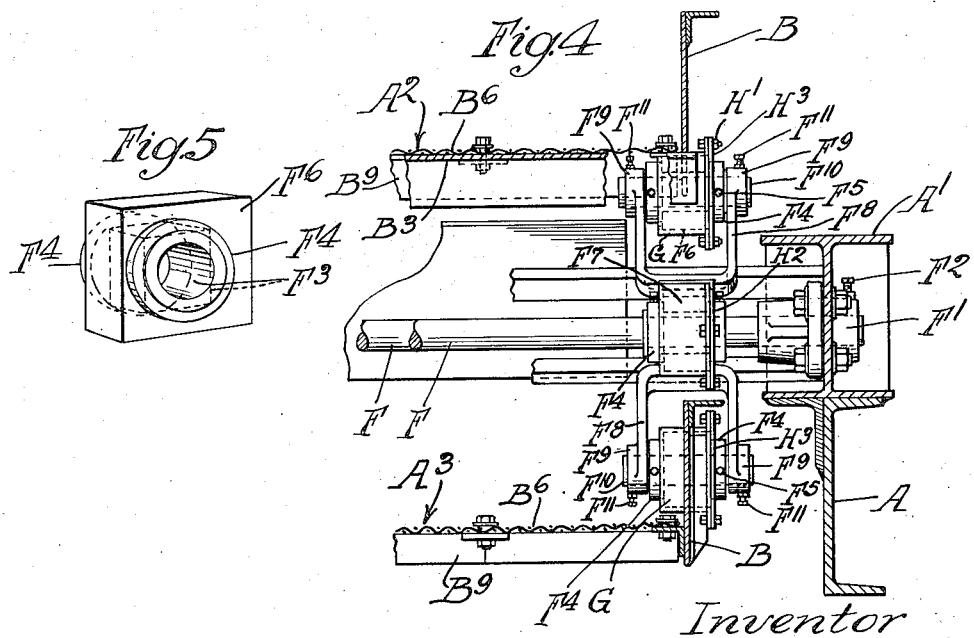
Inventor
Werner Dietrich
by Parker & Carter
Attorneys.

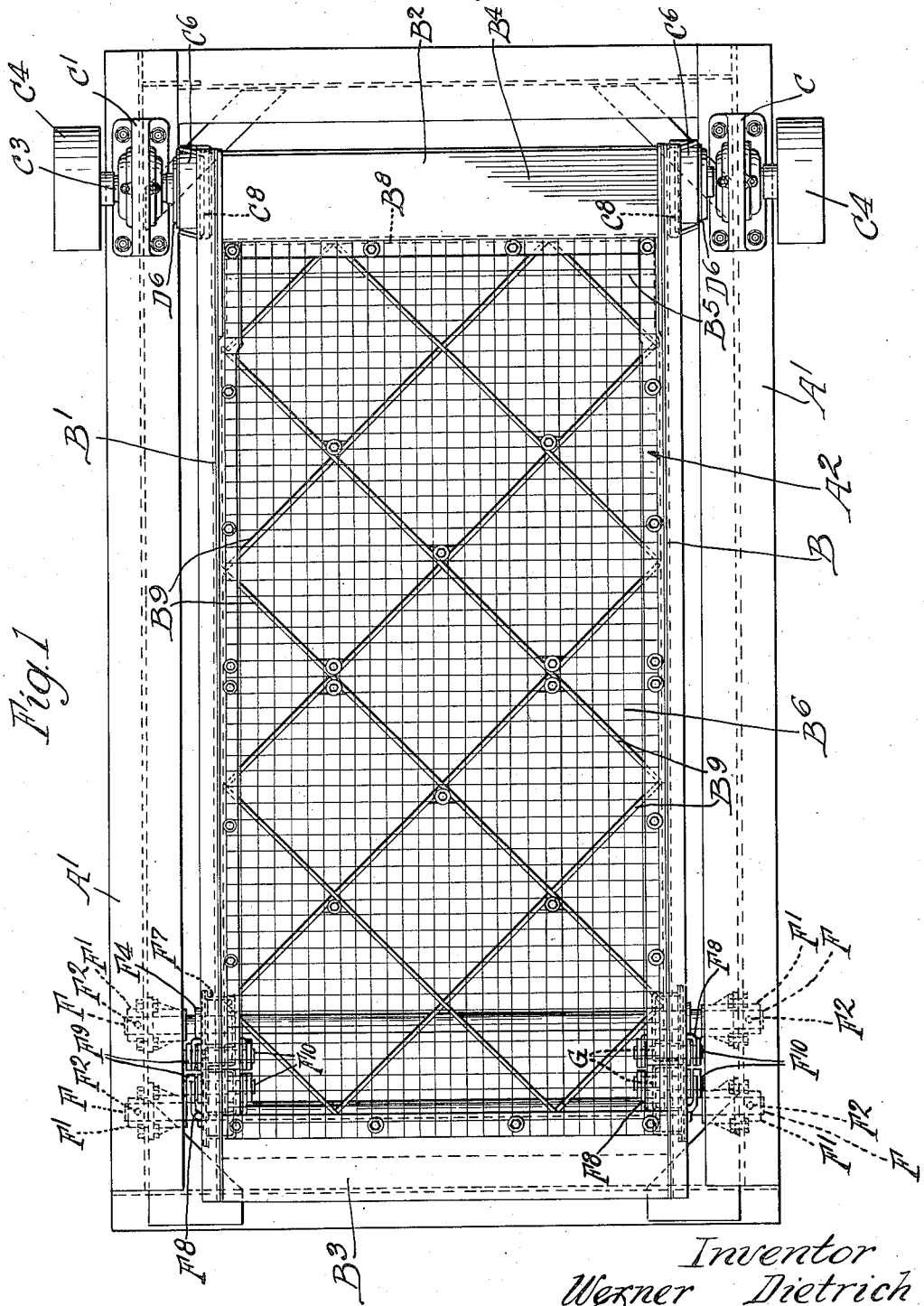

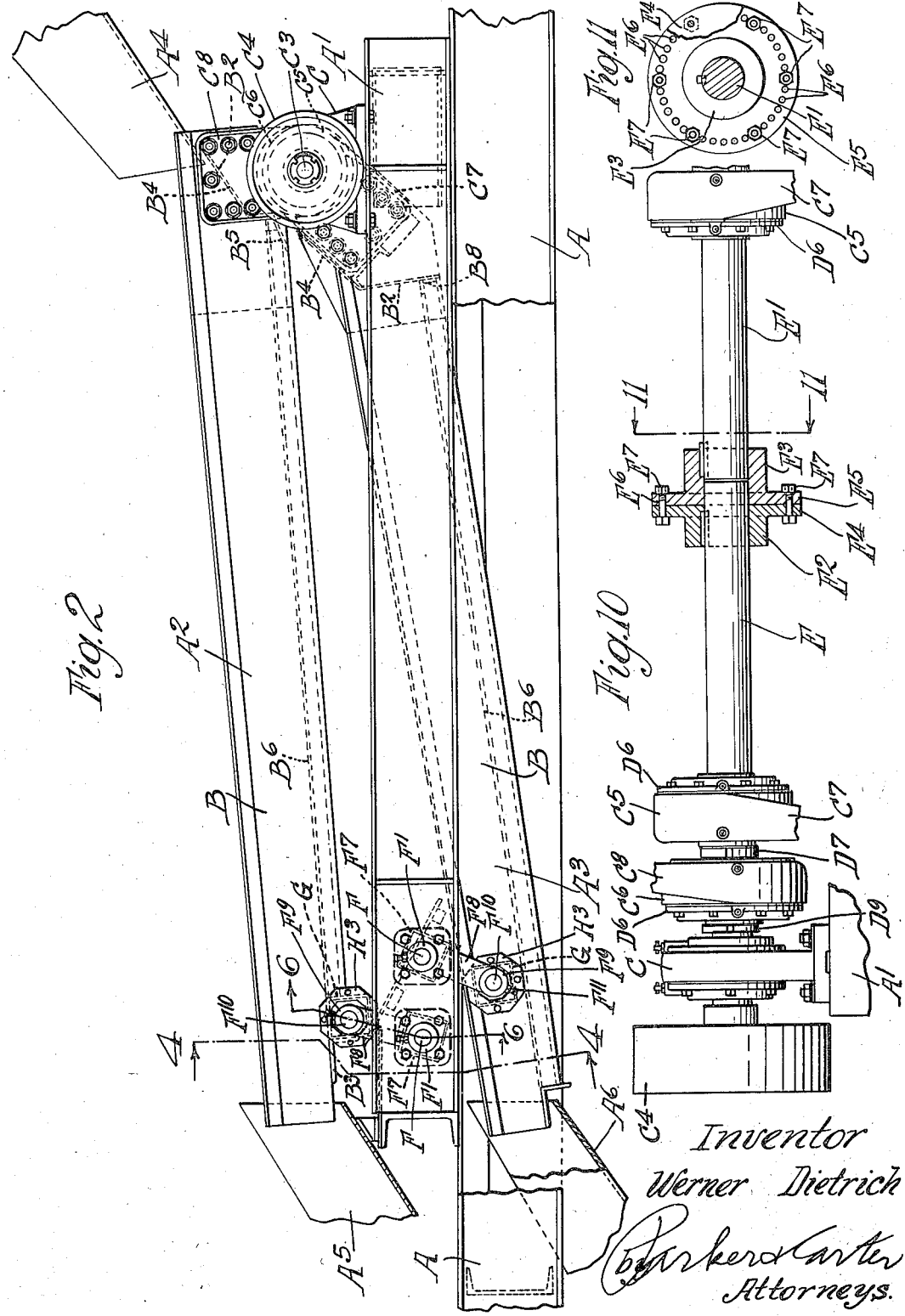

Nov. 5, 1935.  W. DIETRICH  2,019,661
UNIVERSAL SCREEN
Filed July 30, 1932  5 Sheets-Sheet 4
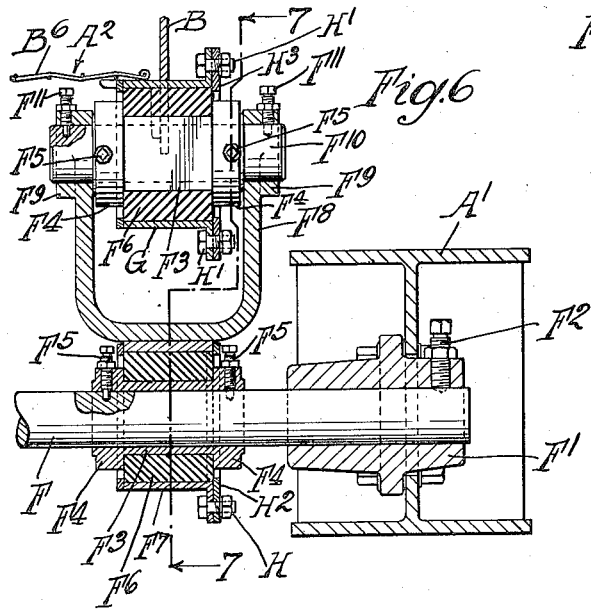
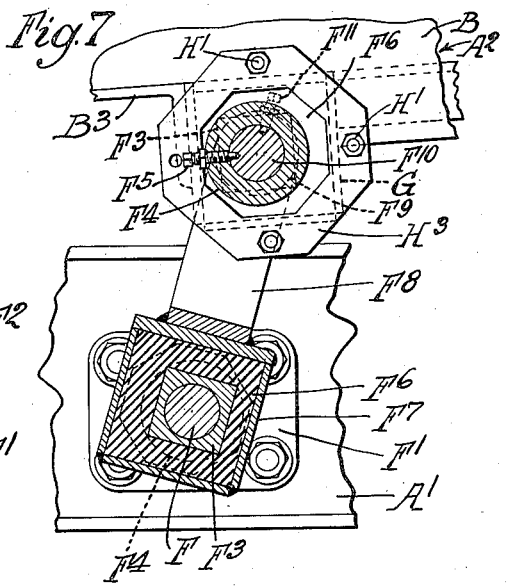
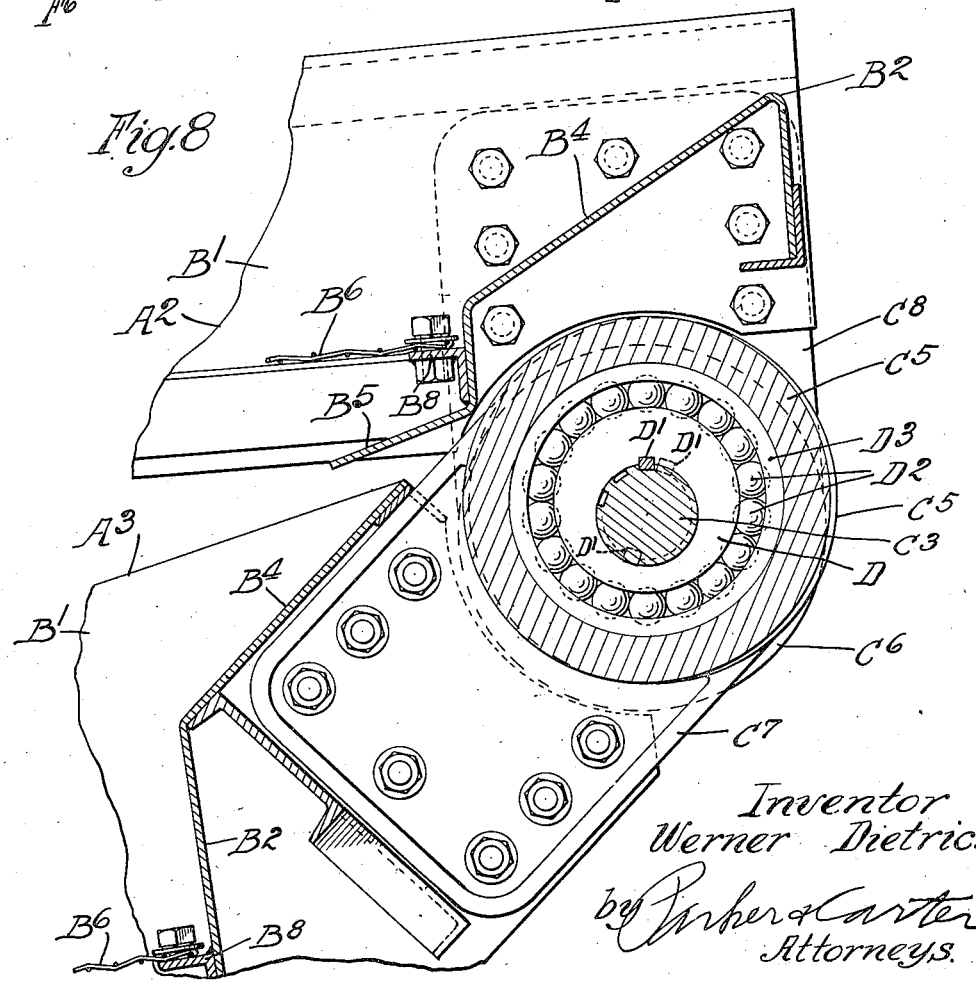
Inventor
Werner Dietrich
by Parker & Carter
Attorneys.

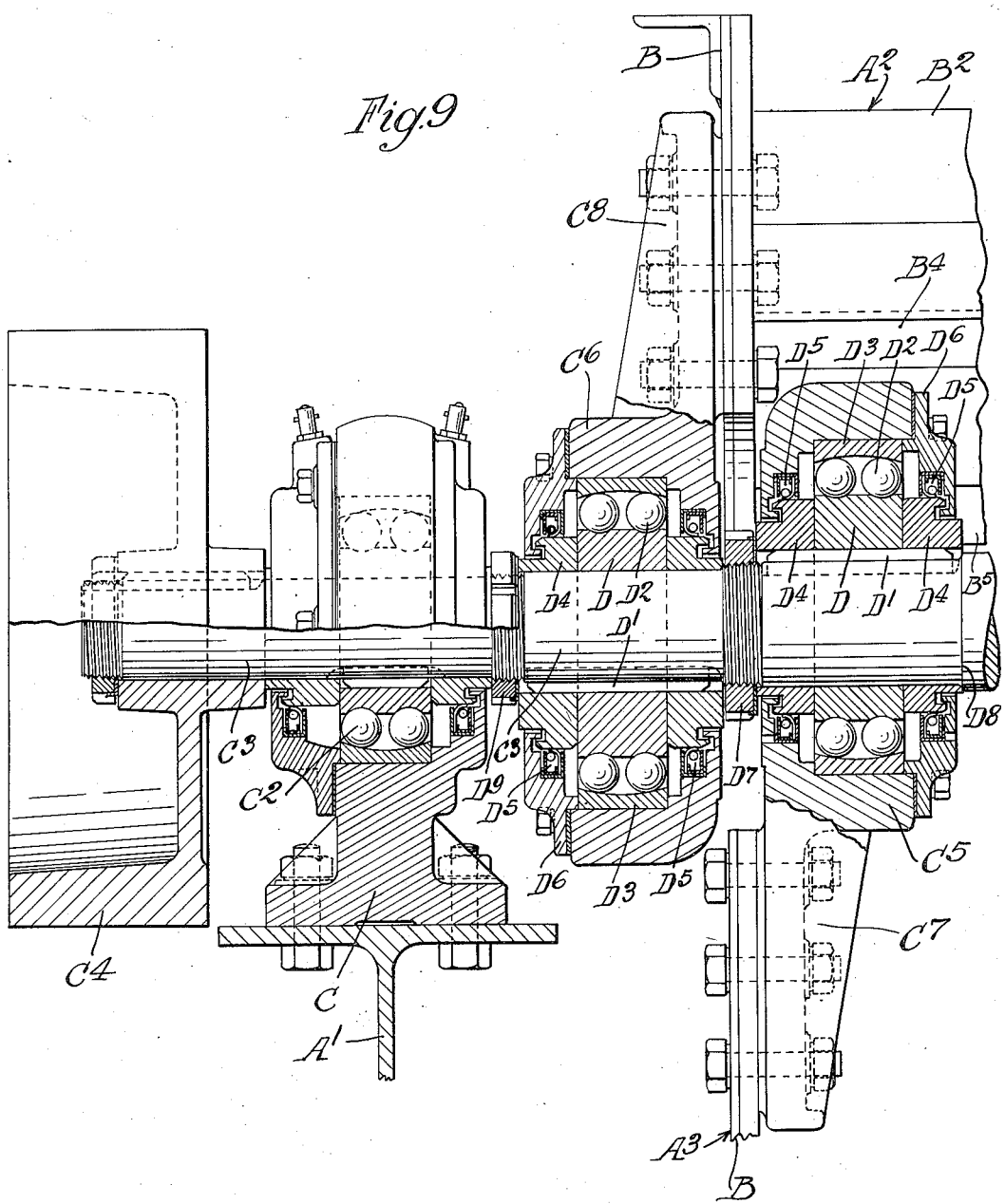

Patented Nov. 5, 1935

2,019,661

UNITED STATES PATENT OFFICE 2,019,661

UNIVERSAL SCREEN

Werner Dietrich, Chicago, Ill., assignor to Roberts and Schaefer Company, Chicago, Ill., a corporation of Illinois Application July 30, 1932, Serial No. 626,433

1 Claim. (Cl. 209—326)

My invention relates to improvements in screens and driving mechanism therefor and has for one object to provide a new and improved form of screen wherein the screen and screen supporting member will be agitated in horizontal and vertical paths, will be moved both laterally and longitudinally and will be given a warped or tilting motion all simultaneously.

Experience has shown that if a screening surface which is but slightly inclined if at all downwardly in the direction of feed is given a forward and back motion, an up and down motion, and a lateral side to side motion and at the same time is rocked both laterally and longitudinally, the combination of these various motions imparted to the head or drive end of the screen will keep the material on the surface in a so-to-speak floating motion, which motion will preferably be increased toward the discharge end of the screen by a suitable supporting mechanism. This will result in greatly increased screen capacity and will result in maintaining the screen meshes open at all times, thereby giving a screen of greater capacity at the same time of very great accuracy in sizing.

The positive rotating motion combined with the side inclination of the drive end at high speed is perhaps most effective to keep the screen meshes open at all times and to size the material with almost constant accuracy. The violent forward and upward thrust which shakes the material as soon as it is delivered on the screen will rapidly stratify the material according to size, bringing the fines close to the screen cloth. This motion also not only tends to propel material forward but due to the side inclination causes the material to tend to turn sidewise and this increased feed will be intensified toward the discharge end owing to the more increased turning action and upward thrust developed at that end.

In general, considering the material to be screened on the screen, I propose to provide an arrangement which, by shaking the granular particles violently when they are first placed on the screen, will cause the larger particles to rise to the top and the smaller to settle to the bottom at which point the largest percentage of the fines will be separated. As the mass of material on the screen moves toward the discharge end, the mass thereon decreases, the bed of material is spread out and becomes thinner the further it travels, and thus more and more fines will be separated out and due to the increased side turning motion, tipping or tilting motion of the particles, the chances are greatly increased that somewhere during their travel down the screen each particle will be brought with its smallest side in engagement with the screen so that it will pass through, thus preventing or at least decreasing the tendency of thin flat particles which are small enough in two dimensions to get through the screen passing over without being separated. Other objects will appear from time to time throughout the specification and claim.

My invention is illustrated more or less diagrammatically in the accompanying drawings, wherein—

Figure 1 is a plan view;

Figure 2 is a side elevation;

Figure 3 is an end elevation with parts broken away;

Figure 4 is a section along the line 4—4 of Figure 2;

Figure 5 is a perspective detail of one of the rubber bearing blocks;

Figure 6 is a section along the line 6—6 of Figure 2 on an enlarged scale;

Figure 7 is a section along the line 7—7 of Figure 6;

Figure 8 is a section along the line 8—8 of Figure 3;

Figure 9 is a detail section of a part of the driving mechanism;

Figure 10 is a detail section of a modified form of drive mechanism;

Figure 11 is a section along the line 11—11 of Figure 10;

Like parts are indicated by like characters throughout the several figures.

A is the floor framework of a building. $A^1$ is the fixed main frame of the screen. $A^2$ is the upper deck frame, $A^3$ is the lower deck frame of a duplex or two-deck screen. $A^4$ is a chute which is adapted to feed material to be screened to the upper screen $A^2$. $A^5$ is a chute receiving the oversize discharged from the screen $A^2$. The fines passing through the screen $A^2$ are deposited on the screen $A^3$ immediately below it. The over-size from the screen $A^3$ passes out through the chute $A^6$. No chute is illustrated to catch the fines from the screen $A^3$ as that forms no part of my present invention.

The upper and lower screens $A^2$, $A^3$, are to all intents and purposes the same. A description of one will suffice for both. The screen comprises sides B $B^1$, head end frame member $B^2$, tail end frame member $B^3$, $B^3$ being substantially horizontal and forming a lip in line with the screening cloth over which the material may pass, the member $B^2$ being generally box-shaped and furnishing a stiffening reinforcement and having a downwardly inclined wall $B^4$ which may receive the material and guide it down to the screen cloth and also covers the screen drive. This member $B^2$ has also a downwardly and inwardly inclined lip $B^5$ to assist in protecting the drive mechanism. $B^6$ is the screen cloth, fastened to flanges $B^8$ on the frames B, $B^1$, $B^2$ and bolted direct to the inner edge of the frame member $B^3$. The rectangular screen frame built up as indicated is reinforced by a plurality of intersecting diagonal vertically disposed narrow bars or strips $B^9$, which intersect as indicated and are all inclined to the normal direction of the wires making up the screen cloth whereby they give stiffness and rigidity, to the frame, support the cloth, and since they are inclined to the movement of material across the screen, while they may to some extent blind the screen cloth at the point where they cut across it, such blind spaces are diagonal and intersect the line of passage of material, thereby producing a minimum of blinding effect.

C $C^1$ are pillow blocks on the main frame $A^1$. They contain any suitable type of anti-friction bearings $C^2$, which support the main drive shaft $C^3$, which shaft is equipped with pulleys or fly wheels $C^4$ adapted to be driven by any suitable means such as a belt traveling over the pulleys. Mounted at each end of the shaft just inside the pillow blocks are bearings $C^5$ $C^6$. The bearing $C^5$ supports by means of brackets $C^7$ the lower screen frame, and the bearing $C^6$ supports by means of brackets $C^8$ the upper screen frame. These bearings as will hereinafter appear are adjustable eccentric bearings so that rotation of the shaft with respect to these bearings, while the bearings are supported by the shaft and in turn support the screen will impart motion to the screen.

Referring now to the details shown in Figure 9, the bearings $C^6$ $C^5$ are identical except for size. The bearings $C^5$ having parts larger than those of $C^6$ so that $C^5$ may be assembled over the holding means associated with $C^6$ without interference. Each bearing comprises a race D having a keyway associated with a key $D^1$ on the shaft, there being preferably a number of keyways on the shaft spaced angularly thereabout to provide adjustment. This bearing race is associated with balls $D^2$ and outer race $D^3$, lock rings $D^4$, grease labyrinth packings $D^5$ and a cover plate $D^6$ to enclose the hole in the bearing housing as indicated. The nut $D^7$ threaded on the shaft exerts a pressure to tie the parts D $D^4$ together against the shoulder $D^8$ on the shaft to lock the bearing $C^5$ and its assembly in position. The nut $D^9$ threaded on the shaft forces the smaller elements D and $D^4$ of the bearing $C^5$ over against the nut $D^7$ to lock them in position on the shaft. It will be noted that the inner races D are eccentric with respect to their outer ball engaging peripheries. As shown in Figure 9, the arrangement is such that the upper screen is in the down position, when the lower screen is in an upper position. Rotation of the shaft will of course cause eccentric action of the bearings $C^5$ $C^6$ and by angularly adjusting the bearings at each end of the shaft it is possible to set the bearings for either or both of the screens out of phase. Preferably they are set one between 5° and 10° in advance of the other, so that as the shaft rotates, the screen has imparted to it a tilting motion in a vertical plane as well as an oscillating or tilting motion in a horizontal plane thereby giving to the screen at the head end the characteristic controlled out of phase tilting and rocking motion which is essential to the operation of my screen.

The relation of the key with the various keyways is shown in Figure 8 in section and the device may be built with a number of keyways or since screens are ordinarily designed for some specific duty, it will be determined in advance what the desired eccentric relation between the bearings at each end of the shaft will be and the keyways cut accordingly as the case may be.

In the modified form shown in Figure 10, the adjustment of eccentricity of the bearings instead of being accomplished by the adjustable keys and keyways is accomplished by splitting the shaft E $E^1$, joining the split ends by coupling collars $E^2$ $E^3$ with flanges $E^4$ $E^5$ perforated as at $E^6$ and held together by bolts $E^7$. These bolts may be released and the two parts of the shaft rotated with respect to one another so as to provide any desired angular relation between the bearings at one end of the shaft and those at the other. In this case the adjustment of the angularity of the bearings for the upper and lower screen will be simultaneous and identical.

Referring to Figures 4 to 7 inclusive, the details of the flexible support for the discharge end of the screen are shown. Reference to Figure 2 shows that the upper screen is supported by a hanger which operates in thrust and the lower screen by a hanger which works in tension, the operation, however, is the same in each case.

F is a supporting cross shaft. It is supported in a socket or hub $F^1$, held in the frame $A^1$ and the set screw $F^2$ holds the shaft against rotation and against longitudinal displacement. Mounted on the shaft is a metallic sleeve $F^3$. Its interior periphery engages the shaft. It has at each end an enlarged hub $F^4$, the outer periphery of the sleeve being preferably square. $F^5$ are set screws in the hub $F^4$ adapted to hold the hub in position against longitudinal displacement and rotation with respect to the shaft. Molded about the rectangular outer periphery of the sleeve and between the hubs is a flexible, preferably rubber block $F^6$. This block is preferably square as indicated and adapted to be received in a socket $F^7$. It will be noted that the center of the cylindrical inner periphery of the sleeve is spaced away from the center of the square or block $F^6$ so that the distance between the center of the sleeve and each outer plane of the block is different, thus giving a possibility for four different adjustments. The socket $F^7$ carries a fork or U-shaped link $F^8$. This fork or U-shaped link $F^8$ terminates in hubs $F^9$ carrying a shaft $F^{10}$ held against rotation and against longitudinal displacement therein by means of set screws $F^{11}$.

Mounted on the shaft $F^{10}$ by means of set screws $F^5$ is a sleeve $F^3$ with a rubber block $F^6$ identically the same as mounted in the socket $F^7$ of the link $F^8$. G is a square socket welded or otherwise secured to the upper screen frame $A^2$ into which the square rubber block about the shaft $F^{10}$ is received.

It will be understood that by mounting the two corners of the screen frame on hangers as indicated with the rubber block at each end of the hanger link, I provide a device which has a maximum of flexibility and a device which makes it possible for the screen to rock, tilt, rotate or agitate as the case may be, thereby causing the hangers to introduce no opposition to the characteristic sideways rotating motion of the screen imparted to it by the angularly spaced or out of phase eccentric bearings.

It frequently is necessary to adjust the angle of inclination of the screen and this is done by loosening the nuts and bolts H, H¹ associated with the cover plates H², H³ of the sockets F⁷ G⁴. When this is done, it is possible to withdraw the block from its socket and the block may be rotated so as to raise or lower the screen or to change the angle of inclination of the screen and to some extent the path of its motion because of course the path of its motion is a resultant of the eccentricity of the bearing and the angle of the link.

I claim:

In combination, a support, a screen mounted upon said support, means for delivering material to the feed end of said screen, means for imparting to said screen a rotary conveying and agitating oscillation decreasing in vertical amplitude continuously from the feed and to the discharge end of the screen, and for imparting a transverse tilting vibration to said screen, increasing in lateral amplitude from the feed to the discharge end of the screen, including a shaft positioned adjacent the feed end of the screen, and means for rotating it, said shaft having angularly displaced eccentric bearings adjacent opposite ends thereof, the screen having bearings surrounding the eccentric bearings on the shaft, and supporting means for the discharge end of the screen, including members secured to the screen and to the support and oscillatable transversely as well as longitudinally of the length of the screen.

WERNER DIETRICH.